United States Patent
Fang

(10) Patent No.: US 11,348,380 B2
(45) Date of Patent: May 31, 2022

(54) BEACON SYSTEM IN AN AUTONOMOUS VEHICLE RADAR FOR VEHICLE IDENTIFICATION

(71) Applicant: Metawave Corporation, Palo Alto, CA (US)

(72) Inventor: Jun Fang, San Jose, CA (US)

(*) Notice: Subject to any disclaimer, the term of this patent is extended or adjusted under 35 U.S.C. 154(b) by 282 days.

(21) Appl. No.: 16/435,942

(22) Filed: Jun. 10, 2019

(65) Prior Publication Data
US 2019/0378356 A1 Dec. 12, 2019

Related U.S. Application Data

(60) Provisional application No. 62/682,758, filed on Jun. 8, 2018.

(51) Int. Cl.
*G07C 5/00* (2006.01)
*H04W 4/46* (2018.01)
*G08G 1/017* (2006.01)

(52) U.S. Cl.
CPC .............. *G07C 5/008* (2013.01); *G08G 1/017* (2013.01); *H04W 4/46* (2018.02)

(58) Field of Classification Search
CPC .......... G07C 5/008; H04W 4/46; H04W 4/80; H04W 4/029; G08G 1/017; G08G 1/161
See application file for complete search history.

(56) References Cited

U.S. PATENT DOCUMENTS

| | | | | |
|---|---|---|---|---|
| 6,472,978 B1* | 10/2002 | Takagi | ................... | G08G 1/005 340/435 |
| 2004/0056793 A1* | 3/2004 | Matsubara | ............ | G01S 7/4004 342/70 |
| 2012/0327840 A1* | 12/2012 | Chen | ....................... | H04L 45/54 370/315 |
| 2019/0131721 A1* | 5/2019 | Dani | ....................... | H01P 1/184 |

OTHER PUBLICATIONS

Bosch, "CAN with Flexible Data-Rate," Specification Version 1.0, Apr. 17, 2012.

(Continued)

*Primary Examiner* — Hongmin Fan
(74) *Attorney, Agent, or Firm* — Sandra Lynn Godsey

(57) ABSTRACT

Examples disclosed herein relate to an autonomous driving system in an ego vehicle. The autonomous driving system includes an antenna system having an antenna controller configured to provide a radar transmission signal for transmission to a target. The antenna system also includes a beacon circuit coupled to the antenna controller and configured to generate a superimposed signal comprising the radar transmission signal and a beacon signal having information that identifies the ego vehicle to other vehicles that are in a range distance of the ego vehicle. The antenna system also includes a metamaterial antenna structure coupled to the beacon circuit and configured to transmit the superimposed signal to the other vehicles. Other examples disclosed herein include a radar system having a beacon system and a method of operating the antenna system in the autonomous driving system of the ego vehicle, for vehicle identification.

20 Claims, 8 Drawing Sheets

(56) References Cited

OTHER PUBLICATIONS

IEEE, "Amendment 1: Physical Layer Specifications and Management Parameters for 100 Mb/s Operation over a Single Balanced Twisted Pair Cable (100BASE-T1)," Oct. 26, 2015.
Chu, D.C., "Polyphase Codes with Good Periodic Correlation Properties," IEEE Transactions on Information Theory, pp. 531-532, Jul. 1972.
Bosch, "CAN Specification," Specification Version 1.0, Apr. 17, 2012.
ETSI, "Digital Video Broadcasting (DVB); Second Generation Framing Structure, Channel Coding and Modulation Systems for Broadcasting . . . ; Part 1: DVB-S2," Jul. 2014.
Popovic, B. M., "Generalized Chirp-like Polyphase Sequences with Optimum Correlation Properties," IEEE Transactions on Information Theory, vol. 38, pp. 1406-1409, Jul. 1992.
Sarwate, D.V., "Bounds on Crosscorrelation and Autocorrelation of Sequences," IEEE Transactions on Information Theory, vol. IT-25, No. 6, pp. 720-724, Nov. 1979.

* cited by examiner

BEACON SYSTEM IN AN AUTONOMOUS VEHICLE RADAR FOR VEHICLE IDENTIFICATION

CROSS-REFERENCE TO RELATED APPLICATIONS

This application claims priority from U.S. Provisional Application No. 62/682,758, filed on Jun. 8, 2018, and incorporated by reference in its entirety.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be vehicles that increasingly assume control of driving functions such as steering, accelerating, braking and monitoring the surrounding environment and driving conditions to respond to events, such as changing lanes or speed when needed to avoid traffic, crossing pedestrians, animals, and so on.

An aspect of making this work is the ability to detect and classify targets in the surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

A beacon system in an autonomous vehicle radar for vehicle identification is disclosed herein. The beacon system can be integrated into an automotive radar system as a subsystem or an additional sensor channel. For example, the beacon system may be co-located with the radar in the autonomous vehicle and operate in the same frequency band as the radar. In various examples, the radar operates in the millimeter wavelength spectrum, covering frequencies between 30 and 300 GHz or a portion thereof. The radar may be placed in the autonomous vehicle (e.g., an ego vehicle) for detecting and identifying targets in the vehicle's path and surrounding environment. The targets may include structural elements in the environment such as roads, walls, buildings, road center medians and other objects, as well as other vehicles, pedestrians, bystanders, cyclists, plants, trees, animals and so on.

In various examples, the ego vehicle is equipped with multiple perception sensors capable of capturing real-world perception data about its path and surrounding environment, including radar, lidar, camera, and so forth. The ego vehicle is also equipped with a vehicle-to-vehicle ("V2V") communications module for communicating with other vehicles, including other autonomous vehicles equipped with perception sensors. As described in more detail below, the beacon system provides an efficient broadcasting mechanism to other vehicles in proximity to the ego vehicle without suffering from latency and other issues currently faced by V2C communications systems. The beacon system also enhances the identification of vehicles. As used herein, the term "autonomous vehicle" may be referred to as an autonomous transport machine for transporting one or more passengers independent of any, if not at least partial, control by any one of the passengers. As used herein, the term "ego vehicle" may refer to a type of autonomous vehicle and may also be referred to as a type of autonomous transport machine.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
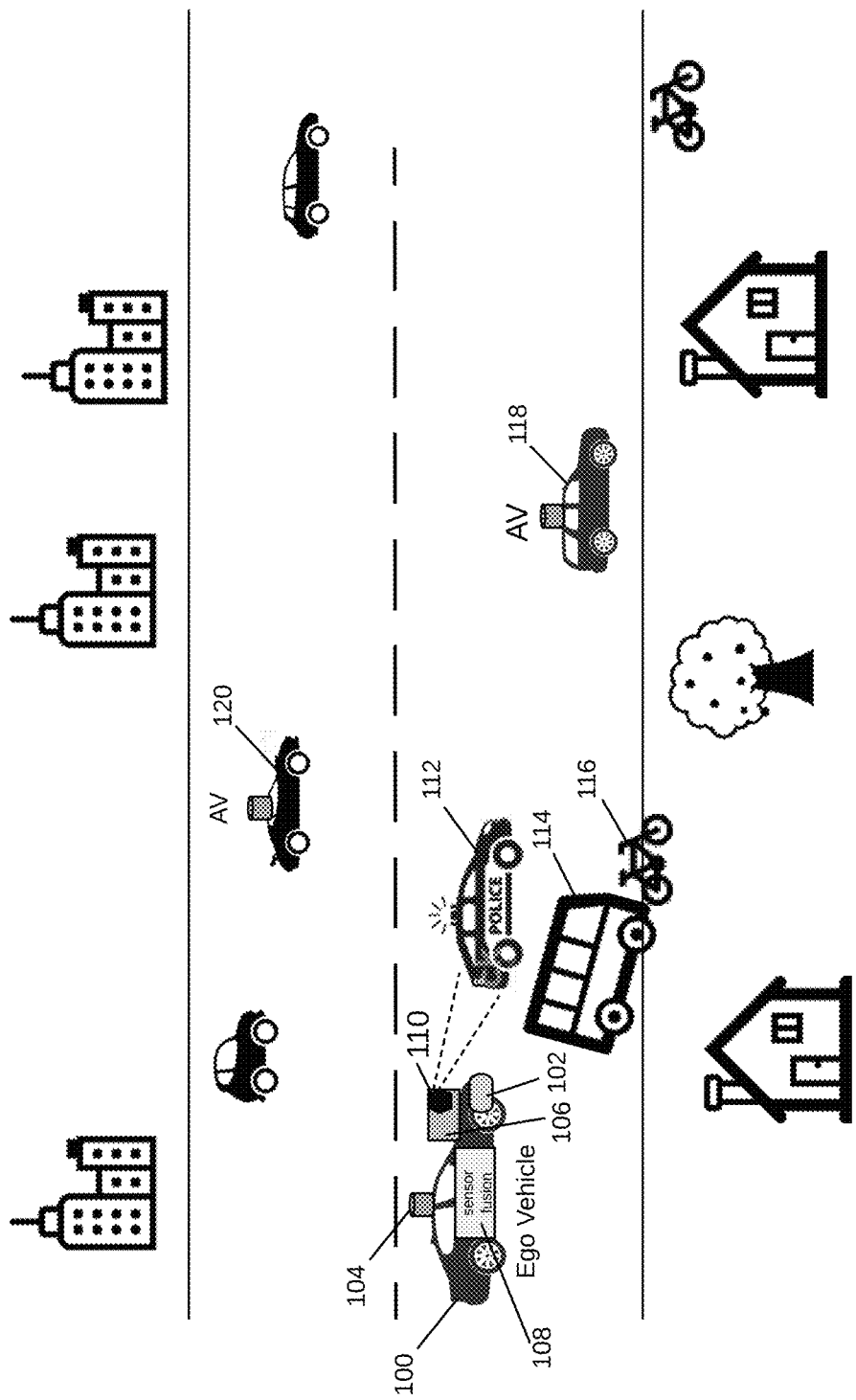
FIG. 1 illustrates a schematic diagram of an example environment in which a beacon system in an autonomous vehicle radar is used for vehicle identification.

FIG. 1 illustrates an example environment in which a beacon system in an autonomous vehicle radar is used for vehicle identification. Ego vehicle 100 is an autonomous vehicle having multiple perception sensors, including camera 102, lidar 104, and radar 106, among others. Camera sensor 102 may be used to detect visible targets and conditions and to assist in the performance of various functions. The lidar sensor 104 can also be used to detect targets outside the ego vehicle 100 and provide this information to adjust control of the vehicle. This information may include information such as congestion on a highway, road conditions, and other conditions that would impact the sensors, actions or operations of the vehicle. Camera sensors are currently used in Advanced Driver Assistance Systems ("ADAS") to assist drivers in driving functions such as parking (e.g., in rear view cameras). Cameras are able to capture texture, color and contrast information at a high level of detail, but similar to the human eye, they are susceptible to adverse weather conditions and variations in lighting. Camera 102 may have a high resolution but may not capture images of targets beyond 50 meters. Lidar sensors measure the distance to an object by calculating the time taken by a pulse of light to travel to an object and back to the sensor. When positioned on top of a vehicle, lidar sensors can provide a 360° three-dimensional (3D) view of the surrounding environment. However, lidar sensors such as lidar 104 are still prohibitively expensive, bulky in size, sensitive to weather conditions and are limited to short ranges (e.g., less than 150-200 meters), with resolution decreasing with range. Radar sensors, on the other hand, have been used in vehicles for many years and operate in all-weather conditions. Radar sensors also use far less processing than the other types of sensors and have the advantage of detecting targets behind obstacles and determining the speed of moving targets.

In various examples and as described in more detail below, radar 106 is an Intelligent Metamaterial ("iMTM") radar system capable of providing a 360° true 3D vision and human-like interpretation of the ego vehicle's path and surrounding environment. The iMTM radar system is capable of shaping and steering Radio Frequency ("RF") beams in all directions in a 360° Field of View ("FoV") and recognizing targets quickly with a high degree of accuracy over a long range of around 300 meters or more. The short range capabilities of camera 102 and lidar 104 and the long range capabilities of radar 106 enable a sensor fusion module 108 in ego vehicle 100 to enhance its target detection and identification.

Vehicle identification can be enhanced with beacon system 110 in radar system 106. In some implementations, the beacon system 110 is embedded within the radar system 106. In other implementations, the beacon system 110 is separate from the radar system 106 in the ego vehicle 100 and communicably coupled to the radar system 106. As illustrated in FIG. 1, beacon system 110 broadcasts a message containing vehicle identification information to other vehicles in its proximity, such as police car 112. The vehicle identification information may include a Vehicle Identification Number ("VIN"), a vehicle license plate number, an identification number issued by a government transportation agency (e.g., Department of Motor Vehicles ("DMV")), or any other type of vehicle identification that can be carried in a short message and be broadcast with beacon system 110. Such vehicle identification information may be useful to police and other first responders in a scene of an accident, as shown with bus 114 colliding with bicycle 116, suspect pursuit, or other safety risk situation, as well as facilitate the management and service of vehicles. This vehicle identification information may be shared within privacy regulations established by governing authorities.

In various examples, having beacon system 110 embedded in radar system 106 enables a beacon signal to be superimposed to a radar signal provided by the radar system 106 at a baseband frequency or at an Intermediate Frequency ("IF"). The beacon signal may be based on a Direct Sequence Spread Spectrum ("DSSS") waveform having a large spreading bandwidth such that the beacon system 110 does not interfere with or get jammed by any other systems in and around the ego vehicle 100 due to its large processing gain. In some implementations, the beacon signal is generated and formatted into a frame structure adopted by the target vehicle's radar signal processing bus, or more generally, the automotive vehicle network. In some implementations, the interface between the beacon system 110 and the vehicle control and data bus, or in-vehicle network, are defined and specified at system level. For example, two major standard bus systems are considered that include, among others, CAN-2.0B and Automotive Ethernet (e.g., IEEE 802.3bw).

Beacon system 110 enables other vehicles to measure a channel condition in the same frequency (or frequency band) such that an efficient communication link can be established between the ego vehicle 100 and the other vehicle. Ego vehicle 100 may establish communication links with Autonomous Vehicles ("AVs") 118 and 120 and broadcast vehicle identification information associated with ego vehicle 100 to the AVs 118 and 120. In some implementations, respective autonomous vehicles (e.g., 100, 118, 120) may include a beacon system and form a beacon network of autonomous vehicles for sharing useful identification and other information between them.

Figure 2:
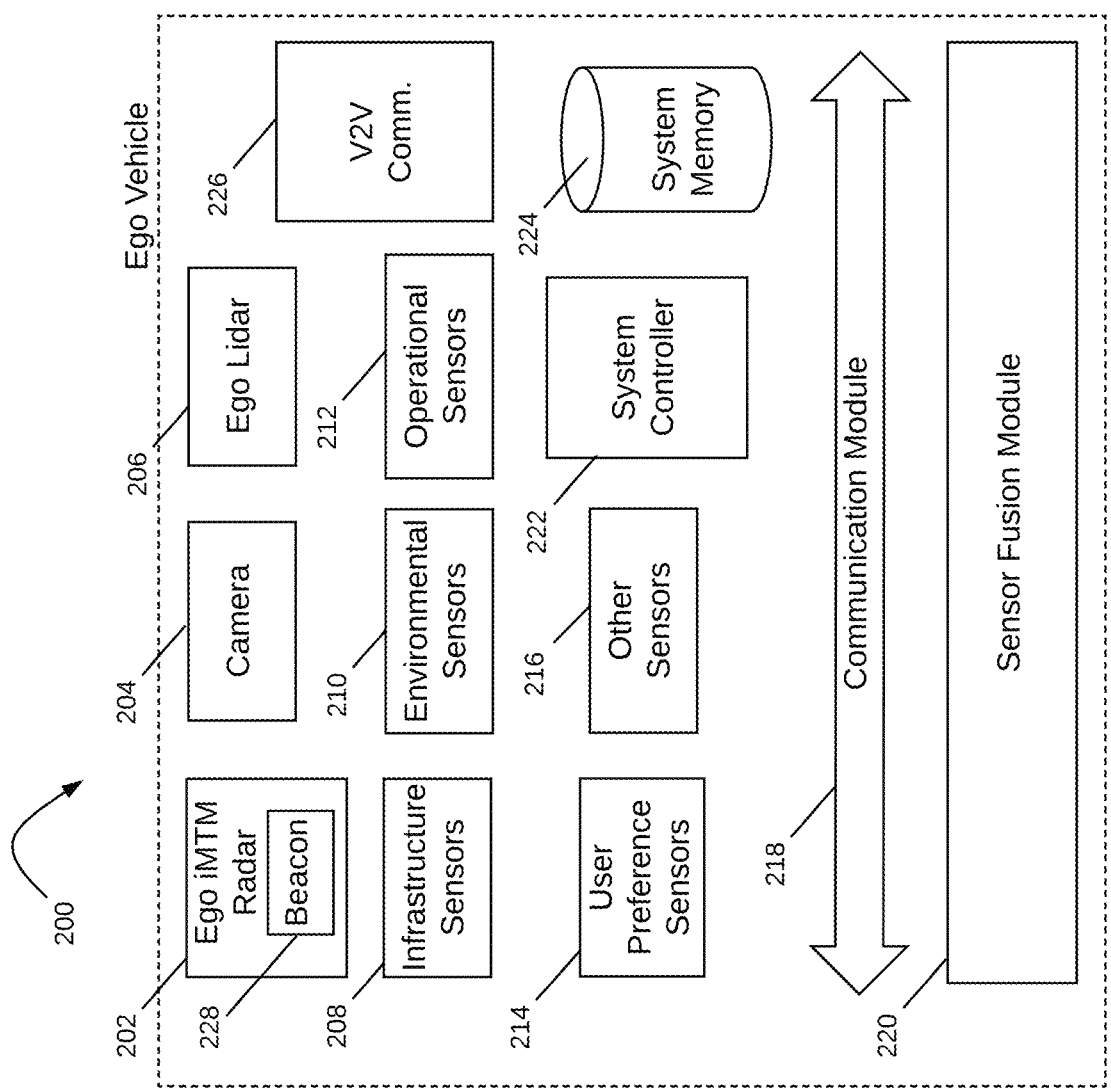
FIG. 2 illustrates a schematic diagram of an autonomous driving system for an ego vehicle in accordance with various examples of the subject technology.

A schematic diagram of an autonomous driving system 200 for an ego vehicle in accordance with various examples is illustrated in FIG. 2. Not all of the depicted components may be used, however, and one or more implementations may include additional components not shown in the figure. Variations in the arrangement and type of the components may be made without departing from the scope of the claims set forth herein. Additional components, different components, or fewer components may be provided.

Autonomous driving system 200 is a system for use in an ego vehicle that provides partial or full automation of driving functions. The driving functions may include, for example, steering, accelerating, braking, and monitoring the surrounding environment and driving conditions to respond to events, such as changing lanes or speed when needed to avoid traffic, crossing pedestrians, animals, and so on. The autonomous driving system 200 includes an ego iMTM radar 202 and other sensor systems such as camera 204, lidar 206, infrastructure sensors 208, environmental sensors 210, operational sensors 212, user preference sensors 214, and other sensors 216. Autonomous driving system 200 also includes a communications module 218, a sensor fusion module 220, a system controller 222, a system memory 224, and a V2V communications module 226. It is appreciated that this configuration of autonomous driving system 200 is an example configuration and not meant to be limiting to the specific structure illustrated in FIG. 2. Additional systems and modules not shown in FIG. 2 may be included in autonomous driving system 200.

Figure 4:
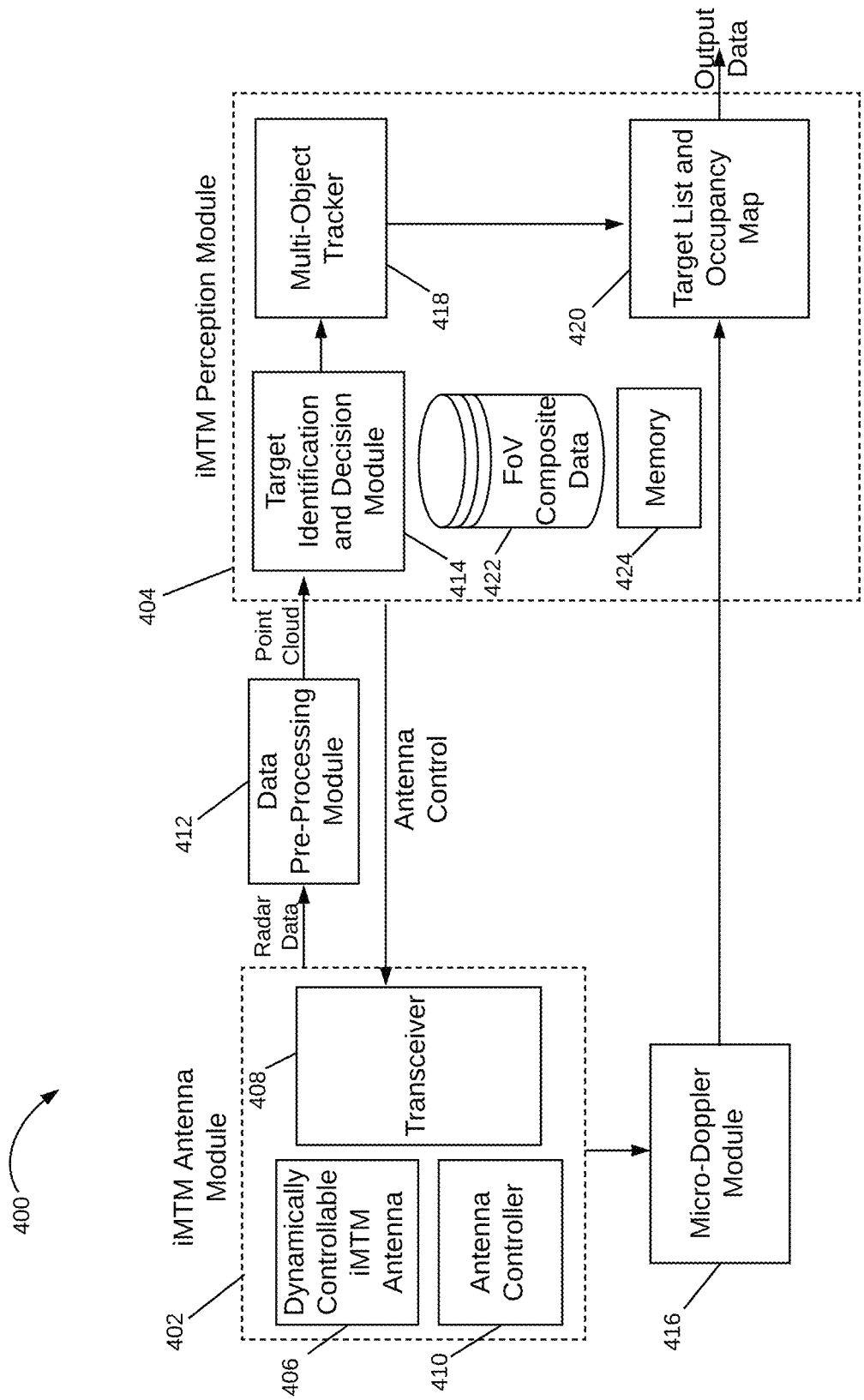
FIG. 4 illustrates a schematic diagram of an iMTM radar system for use in an autonomous driving system in accordance with various examples of the subject technology.

Ego iMTM radar 202 includes an iMTM antenna module (described in more detail below with reference to FIGS. 4 and 5) for providing dynamically controllable and steerable beams that can focus on one or multiple portions of a 360° FoV of the vehicle. The beams radiated from the iMTM antenna module are reflected back from targets in the vehicle's path and surrounding environment and received and processed by the ego iMTM radar 202 to detect and identify the targets. The ego iMTM radar 202 also has an iMTM perception module as shown in FIG. 4 that is trained to detect and identify targets and control the iMTM antenna module as desired. Camera sensor 204 and ego lidar 206 are also used to detect targets in the path and surrounding environment of the ego vehicle, albeit in a much lower range. A beacon system 228 is embedded in the ego iMTM radar 202 for broadcasting vehicle identification or other information to other vehicles.

Infrastructure sensors 208 may provide information from infrastructure while driving, such as from a smart road configuration, bill board information, traffic alerts and indicators, including traffic lights, stop signs, traffic warnings, and so forth. This is a growing area, and the uses and capabilities derived from this information are immense. Environmental sensors 210 detect various conditions outside, such as temperature, humidity, fog, visibility, precipitation, and so forth. Operational sensors 212 provide information about the functional operation of the vehicle. This may be battery charge level, tire pressure, fuel levels, brake wear, and so forth. The user preference sensors 214 may be configured to detect conditions that are part of a user preference. This may be temperature adjustments, smart window shading, and so forth. Other sensors 216 may include additional sensors for monitoring conditions in and around the vehicle.

In various examples, the sensor fusion module 220 optimizes these various functions to provide an approximately comprehensive view of the vehicle and environments. Many types of sensors may be controlled by the sensor fusion module 220. These sensors may coordinate with each other to share information and consider the impact of one control action on another system. In one example, in a congested driving condition, a noise detection module (not shown) may identify that there are multiple radar signals that may interfere with the vehicle. This information may be used by an iMTM perception module in autonomous driving system 200 to adjust the beam size of the iMTM antenna module to avoid these other signals and minimize interference.

In another example, environmental sensor 210 may detect that the weather is changing, and visibility is decreasing. In this situation, the sensor fusion module 220 may determine to configure the other sensors to improve the ability of the vehicle to navigate in these new weather conditions. The configuration may include turning off one or more sensors, such as camera 204 and/or lidar 206 or reducing the sampling rate of these visibility-based sensors. This effectively places reliance on the sensor(s) adapted for the current situation. In response, the iMTM perception module configures the iMTM radar 202 for these conditions as well. For example, the iMTM radar 202 may reduce the beam width to provide a more focused beam, and thus a finer sensing capability.

In various examples, the sensor fusion module 220 may send a direct control signal to the iMTM antenna module based on historical conditions and controls. The sensor fusion module 220 may also use some of the sensors within autonomous driving system 200 to act as feedback or calibration for the other sensors. In this way, an operational sensor 212 may provide feedback to the iMTM perception module and/or the sensor fusion module 220 to create templates, patterns and control scenarios. These are based on successful actions or may be based on poor results, where the sensor fusion module 220 learns from past actions.

Data from sensors 202-216 may be combined in sensor fusion module 220 to form fused sensor data that improves the target detection and identification performance of autonomous driving system 200. Sensor fusion module 220 may itself be controlled by system controller 222, which may also interact with and control other modules and systems in the vehicle. For example, system controller 222 may turn on and off the different sensors 202-216 as desired, or provide instructions to the vehicle to reduce velocity or stop upon identifying a driving hazard (e.g., deer, pedestrian, cyclist, or another vehicle suddenly appearing in the vehicle's path, flying debris, etc.)

All modules and systems in autonomous driving system 200 communicate with each other through communication module 218. Autonomous driving system 200 also includes system memory 224, which may store information and data (e.g., static and dynamic data) used for operation of autonomous driving system 200 and the ego vehicle using autonomous driving system 200. V2V communications module 226 is used for communication with other vehicles. The V2V communications may also include information from other vehicles that is invisible to the user, driver, or rider of the vehicle, and may help vehicles coordinate to avoid an accident. In various examples, the beacon system 228 can be a part of the V2V communications module 226.

Figure 3:
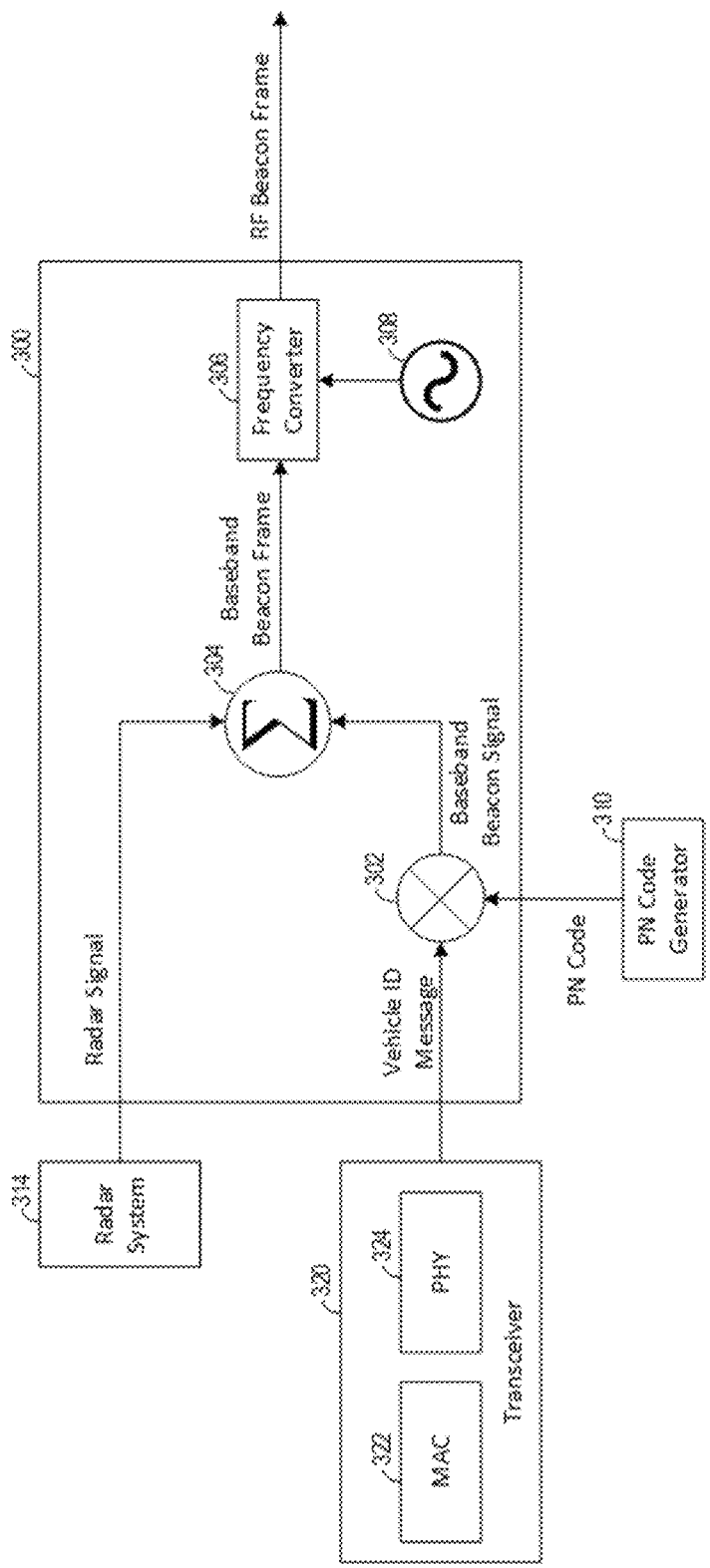
FIG. 3 illustrates a schematic diagram of a circuit for superimposing a beacon signal to a radar signal in the iMTM radar of FIG. 2 in accordance with various examples of the subject technology.

Attention is now directed to FIG. 3, which illustrates a schematic diagram of a beacon circuit 300 for superimposing a beacon signal to a radar signal in the ego iMTM radar 202 of FIG. 2. Not all of the depicted components may be used, however, and one or more implementations may include additional components not shown in the figure. Variations in the arrangement and type of the components may be made without departing from the scope of the claims set forth herein. Additional components, different components, or fewer components may be provided.

In some implementations, the beacon system 228 is, or includes at least a portion of, the beacon circuit 300. The beacon circuit 300 includes a multiplier 302, a summation circuit 304, and a frequency converter 306. As illustrated in FIG. 3, the beacon circuit 300 is coupled to a local oscillator 308. The local oscillator 308 may be co-located on a same integrated circuit die as that of the beacon circuit 300 in some implementations, or the local oscillator 308 may be located on a separate integrated circuit die in other implementations.

The multiplier 302 is coupled to a first input of the summation circuit 304, and a radar system (e.g., ego iMTM radar 202), or a portion thereof, is coupled to a second input of the summation circuit 304. The output of the summation circuit 304 is coupled to a first input of the frequency converter 306, and the output of the local oscillator 308 is coupled to a second input of the frequency converter 306. The output of the frequency converter 306 is coupled to an antenna module, such as a Dynamically Controllable iMTM ("DCiMTM") antenna module as will be described below with reference to FIGS. 4 and 5.

In some implementations, the beacon circuit 300 is coupled to a transceiver module 320. The transceiver module 320 includes a Medium Access Control ("MAC") module 322 and a Physical ("PHY") module 324. In other implementations, the MAC module 322 and the PHY module 324 are separately located in different modules with a Gigabit Media Independent Interface ("GMII") therebetween or other type of interface depending on implementation. In some aspects, the MAC module 322, in particular the transmit side of the MAC module 322, is communicably coupled to a Service Access Point ("SAP") (not shown), and the MAC module 322 receives control information, such as vehicle identification information and other potentially useful data, from the SAP. This received vehicle identification information is then formatted and framed into MAC Protocol Data Units ("MPDUs"). The PHY module 324 interfaces with the MAC module 322 and with the over-the-air interface (or RF layer) in the beacon circuit 300. The PHY module 324 receives the MPDUs from the MAC module 322, and the MPDUs are then processed by the PHY module 324 and transmitted into the RF layer of the beacon circuit 300 to produce an RF beacon frame, which uses the same radio spectrum, for example, in a range of 77 GHz to 81 GHz.

In one or more implementations, the MAC layer data, which includes vehicle identification information, such as a registration number of the vehicle, manufacturer name of the vehicle, production year of the vehicle, and other useful vehicle identification data, is formatted into a frame format associated with the vehicle network of the ego vehicle. Examples of the frame format will be discussed with reference to FIGS. 8 and 9. The In-phase and Quadrature ("IQ") data at the PHY module 324 includes a binary representation of the received MAC layer data, where each of 2-bits is mapped into a Quadrature Phase Shift Keying ("QPSK") symbol, for both I- and Q-branches utilizing either natural mapping or gray mapping.

In some aspects, the beacon circuit 300 can operate in a baseband frequency or intermediate frequency. In the beacon circuit 300, a Pseudo-random Noise ("PN") code sequence is fed to the multiplier 302 and multiplied with a Vehicle Identification ("VID") message signal by the multiplier 302 to form a baseband beacon signal. In some examples, the baseband beacon signal produced from the spectrum spreading operation is a multi-phase signal with a constant amplitude. The baseband beacon signal includes the vehicle identification information such as a VIN, a DMV license plate number or any other short message containing a vehicle identification for broadcast with a wireless beacon (e.g., beacon system 228). The radar signal may be, or include, for example, a Frequency-Modulated Continuous Wave ("FMCW") signal.

In some aspects, the PN code sequence is generated and fed by a PN code generator 310. Each PHY layer frame containing all the necessary data may be arranged with baseband QPSK symbols. Each QPSK symbol may be multiplied by a complex PN code in some implementations, or the QPSK symbol has its I-bit multiplied by one binary PN code and its Q-bit multiplied by another binary PN code, which is either identical or different than the I-bit PN code, in other implementations. In some implementations, phase modulation is used in the spectrum spreading modulator and demodulator of the transceiver module 320.

The PN code sequence may be generated with a specific length, which results in an RF beacon frame occupying the entire available bandwidth (e.g., 4 GHz), or at least a portion thereof. For example, the beacon circuit 300 can produce an RF beacon frame having a bandwidth of 1 GHz, 2 GHz and 3 GHz, in addition to 4 GHz, or any other suitable bandwidth between 1 GHz up to 4 GHz. Although the present disclosure indicates a particular RF bandwidth of 4 GHz, the subject technology is not limited to any specific radio signal bandwidth.

The PN code sequence may include auto-correlation properties or cross-correlation properties. Although the present disclosure indicates a particular spectrum spreading PN code, the subject technology is not limited to any specific system configuration and/or specific spectrum spreading code. In some implementations, the beacon circuit 300 performs the spectrum spreading operation in the PHY layer.

In some aspects, the spectrum spreading operation includes a DSSS operation. In this respect, the spectrum spreading operation can utilize a PN code sequence having sufficient variable length, such that the PN code sequence can adapt to either the MAC layer signal bandwidth in terms of number of symbols per second, and also adapt to the RF signal (or air-interface) bandwidth (e.g., in a range of 1 GHz to 4 GHz).

The PN code sequence may include a Zadoff-Chu sequence (or referred to as "ZC codes"). ZC codes may be defined with any length and have a large number of codes for any specific length. In this respect, one or multiple ZC codes may be selected for a targeted system configuration. In one or more implementations, the ZC codes include a particular signal structure so that signal interference can be minimized based at least on their auto-correlation properties.

For system configurations using multiple PN code sequences of the same length, it may be preferable to select L as an odd length. In the polyphase code families, the PN code generator 310 can construct odd-length polyphase sequences with periodic auto-correlation functions and substantially-optimum periodic cross-correlation functions meeting Sarwate bound. In some aspects, the absolute value of optimum cross-correlation functions can be lower bounded by $\sqrt{L}$, with L being the length of the sequences. In other aspects, if an interferer is lower than the signal of interest by about 30 dB in power, the interference is considered sufficiently low and can be neglected. In this respect, the PN code sequence length can be selected in a range of 1000 to about 2000, as an acceptable trade-off between performance and complexity.

In one or more implementations, the PN code sequence may include a long ZC code that can be used by a certain number of vehicles in a range distance from the ego vehicle (e.g., 100, 200) as long as the code phases are different among the whole group of vehicles. This configuration can offer better performance than a similar configuration that employs a long m-sequence. In one or more implementations, the PN code sequence may include a subset of ZC codes selected from a specific group of ZC codes of a same length along with a minimization of their pair-wise cross-correlations.

The encoded VID message signal from the multiplier 302 is fed and combined (or superimposed) with a radar signal (provided by a radar system 314) by the summation circuit 304 to form a baseband beacon signal frame at the output of summation circuit 304. In some implementations, the baseband beacon signal frame employs one of the frame formats described in FIGS. 8 and 9 depending on a type of in-vehicle network interface (e.g., CAN or Ethernet). As used herein, the term "baseband beacon signal frame" may be referred to as a "superimposed signal" for having a baseband beacon signal superimposed to a radar signal.

The baseband beacon signal frame provided by the summation circuit 304 is then fed to the frequency converter 306 for up-conversion of the baseband beacon signal frame to a higher frequency (e.g., millimeter wavelength frequency) using one or more local oscillator frequency signals provided by the local oscillator 308. The frequency converter 306 generates an RF beacon frame that is a frequency-converted signal, which is then sent to the antenna module for other necessary RF functionalities such as amplification, filtering and so forth, and finally transmitted into the air interface for over-the-air transmission. The antenna module generates an RF signal based at least on the frequency-converted signal provided by the beacon circuit 300 and transmits the RF signal to other vehicles in its vicinity, which are then capable of receiving the RF signal and decoding the vehicle identification message from the received RF signal.

FIG. 4 illustrates a schematic diagram of an iMTM radar system 400 for use in the ego vehicle in accordance with various examples. The iMTM radar system 400 is a "digital eye" with true 3D vision and capable of a human-like interpretation of the world. The "digital eye" and human-like interpretation capabilities are provided by two main modules: iMTM Antenna Module 402 and iMTM Perception Module 404. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The iMTM antenna module 402 includes a Dynamically Controllable iMTM ("DCiMTM") antenna 406, a transceiver module 408 and an antenna controller 410. The DCiMTM antenna 406 can radiate dynamically controllable and highly-directive RF beams using meta-structures. A meta-structure, as generally defined herein, is an engineered, non- or semi-periodic structure that is spatially distributed to meet a specific phase and frequency distribution. In some implementations, the meta-structures include metamaterials. The transceiver module 408 is coupled to the DCiMTM antenna 406, and prepares a signal for transmission through a transmitter portion of the transceiver module 408. In some examples, the prepared signal is a sweep signal for a radar device. In some aspects, the sweep signal is defined by modulation and frequency. In various examples, the beacon circuit 300 for superimposing a baseband beacon signal to a radar transmission signal may be included in or coupled to the transceiver module 408. The sweep signal is provided to the DCiMTM antenna 406 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 410, such as at the direction of iMTM perception module 404.

The RF beams reflect from targets in the ego vehicle's path and surrounding environment and the RF beam reflections are received by a receiver portion of the transceiver module 408 through the DCiMTM antenna 406. The receiver portion may acquire the PN code chip timing, including the frequency and phase. At first, the receiver portion can detect one or more signal peaks in the received RF signal by correlating a local reference PN code with the received RF signal at different phases. In some aspects, the received RF signal may originate from several vehicles transmitting the same ZC code. In this respect, multiple signal peaks can be present at the output of the correlator, where each signal peak corresponds to a respective vehicle. In cases where a unified and synchronized timing reference is present in all the vehicles, the receiving procedure with respect to each of the vehicles can determine the relative distances mutually and precisely.

In one or more implementations, the receiver portion of the transceiver module 408 can write the receiver correlation data, as detected with the signal peaks present at the output of the correlator, into non-permanent storage, such as volatile memory. In this respect, a further stage of processing can be performed by the data pre-processing module 412 to identify the vehicle identification information, together with other information data carried with these signals transmitted from different vehicles present in the field.

In one or more implementations, following the RF operations such as receiving, including down-conversion and filtering in the iMTM antenna module 402, baseband signals are then converted to digital domain through analog-to-digital converters in the iMTM antenna module 402 for data (e.g., objects) detection by the iMTM perception module 404. For example, radar data from the received RF beams is provided to the iMTM perception module 404 for target detection and identification. In some implementations, a data pre-processing module 412, coupled between the iMTM antenna module 402 and the iMTM perception module 404, can process the radar data to encode it into a point cloud for use by the iMTM perception module 404. In various examples, the data pre-processing module 412 can be a part of the iMTM antenna module 402 or the iMTM perception module 404, such as on the same circuit board as the other modules within the iMTM antenna module 402 or iMTM perception module 404. Also, in various examples, the data encoding may use the lidar point cloud from the ego lidar to perform NLOS correction in the radar data.

The radar data may be organized in sets of Range-Doppler ("RD") map information, corresponding to 4D information that is determined by each RF beam radiated off of targets, such as azimuthal angles, elevation angles, range, and velocity. The RD maps may be extracted from FMCW radar pulses and contain both noise and systematic artifacts from Fourier analysis of the pulses. The iMTM perception module 404 controls further operation of the iMTM antenna module 402 by, for example, providing an antenna control signal containing beam parameters for the next RF beams to be radiated from the iMTM cells in the DCiMTM antenna 406.

In operation, the antenna controller 410 is responsible for directing the DCiMTM antenna 406 to generate RF beams with determined parameters such as beam width, transmit angle, and so on. The antenna controller 410 may, for example, determine the parameters at the direction of iMTM perception module 404, which may at any given time determine to focus on a specific area of an FoV upon identifying targets of interest in the ego vehicle's path or surrounding environment. The antenna controller 410 determines the direction, power, and other parameters of the RF beams and controls the DCiMTM antenna 406 to achieve beam steering in various directions. The antenna controller 410 also determines a voltage matrix to apply to reactance control mechanisms coupled to the DCiMTM antenna 406 to achieve a given phase shift. In some examples, the DCiMTM antenna 406 is adapted to transmit a directional beam through active control of the reactance parameters of the individual iMTM cells that make up the DCiMTM antenna 406. The iMTM perception module 404 provides control actions to the antenna controller 410 at the direction of the Target Identification and Decision Module 414.

Next, the DCiMTM antenna 406 radiates RF beams having the determined parameters. The RF beams are reflected from targets in and around the ego vehicle's path (e.g., in a 360° field of view) and are received by the transceiver module 408 in iMTM antenna module 402. The iMTM antenna module 402 transmits the received 4D radar data to the data pre-processing module 412 for generating a point cloud that is then sent to the target identification and decision module 414 of the iMTM perception module 404. A micro-doppler module 416 coupled to the iMTM antenna module 402 and the iMTM perception module 404 extracts micro-doppler signals from the 4D radar data to aid in the identification of targets by the iMTM perception module 404. The micro-doppler module 416 takes a series of RD maps from the iMTM antenna module 402 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, the iMTM perception module 404 can determine the class of the target (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 416 can be a part of the iMTM antenna module 402 or the iMTM perception module 404, such as on the same circuit board as the other modules within the iMTM antenna module 402 or iMTM perception module 404.

The target identification and decision module 414 receives the point cloud from the data pre-processing module 412, processes the point cloud to detect and identify targets, and determines the control actions to be performed by the iMTM antenna module 402 based on the detection and identification of such targets. For example, the target identification and decision module 414 may detect a cyclist on the path of the ego vehicle and direct the iMTM antenna module 402, at the instruction of its antenna controller 410, to focus additional RF beams at a given phase shift and direction within the portion of the FoV corresponding to the cyclist's location.

The iMTM perception module 404 may also include a multi-object tracker 418 to track the identified targets over time, such as, for example, with the use of a Kalman filter. The multi-object tracker 418 matches candidate targets identified by the target identification and decision module 414 with targets it has detected in previous time windows. By combining information from previous measurements, expected measurement uncertainties, and some physical knowledge, the multi-object tracker 418 generates robust, accurate estimates of target locations.

Information on identified targets over time are then stored at a target list and occupancy map 420, which keeps tracks of targets' locations and their movement over time as determined by the multi-object tracker 418. The tracking information provided by the multi-object tracker 418 and the micro-doppler signal provided by the micro-doppler module 416 are combined at the target list and occupancy map 420 to produce an output containing the type/class of target identified, their location, their velocity, and so on. This information from iMTM radar system 400 is then sent to a sensor fusion module (e.g., sensor fusion module 220 in the ego vehicle), where it is processed together with information from other sensors in the ego vehicle.

In various examples, the iMTM perception module 404 includes an FoV composite data unit 422, which stores information that describes an FoV. This information may be historical data used to track trends and anticipate behaviors and traffic conditions or may be instantaneous or real-time data that describes the FoV at a moment in time or over a window in time. The ability to store this data enables the iMTM perception module 404 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the iMTM perception module 404 may determine to narrow the beam width for a more focused view of that sector or area in the FoV. The next scan may indicate the targets' length or other dimension, and if the target is a vehicle, the iMTM perception module 404 may consider what direction the target is moving and focus the beams on that area. Similarly, the echo may be from a spurious target, such as a bird, which is small and moving quickly out of the path of the vehicle. There are a variety of other uses for the FoV composite data 422, including the ability to identify a specific type of target based on previous detection. The iMTM perception module 404 also includes a memory 424 that stores useful data for iMTM radar system 400, such as, for example, information on which subarrays of the DCiMTM antenna 406 perform better under different conditions.

In various examples described herein, the use of iMTM radar system 400 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 115 km/h, a driver may need to slow down to 40 km/h when visibility is poor. Using the iMTM radar system 400, the driver (or driverless vehicle) may maintain the maximum safe speed without regard to the weather conditions. Even if other drivers slow down, a vehicle enabled with the iMTM radar system 400 can detect those slow-moving vehicles and obstacles in the path of the vehicle and avoid/navigate around them.

Additionally, in highly congested areas, it is necessary for an autonomous vehicle to detect targets in sufficient time to react and take action. The examples provided herein for an iMTM radar system increase the sweep time of a radar signal so as to detect any echoes in time to react. In rural areas and other areas with few obstacles during travel, the iMTM perception module 404 adjusts the focus of the RF beam to a larger beam width, thereby enabling a faster scan of areas where there are few echoes. The iMTM perception module 404 may detect this situation by evaluating the number of echoes received within a given time period and making beam size adjustments accordingly. Once a target is detected, the iMTM perception module 404 determines how to adjust the beam focus. This is achieved by changing the specific configurations and conditions of the DCiMTM antenna 406. In one example scenario, the voltages on the varactors are adjusted. In another example scenario, a subset of iMTM unit cells is configured as a subarray. This configuration means that this set may be treated as a single unit, and all the varactors are adjusted similarly. In another scenario, the subarray is changed to include a different number of unit cells, where the combination of iMTM unit cells in a subarray may be changed dynamically to adjust to conditions and operation of the iMTM radar system 400.

All of these detection scenarios, analysis and reactions may be stored in the iMTM perception module 404, such as in the memory 424, and used for later analysis or simplified reactions. For example, if there is an increase in the echoes received at a given time of day or on a specific highway, that information is fed into the antenna controller 410 to assist in proactive preparation and configuration of the DCiMTM antenna 406. Additionally, there may be some subarray combinations that perform better, such as to achieve a desired result, and this is stored in the memory 424.

Figure 5:
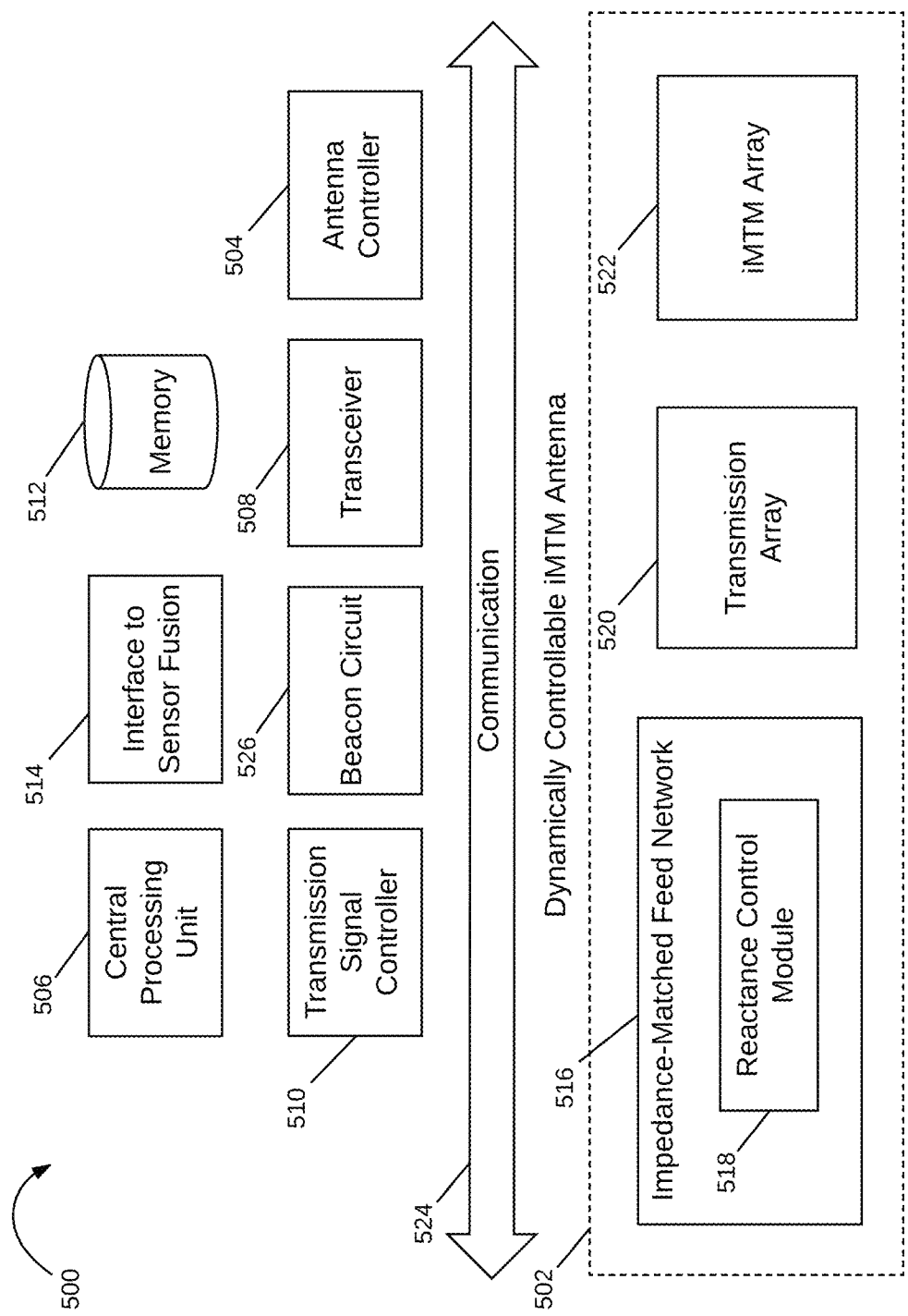
FIG. 5 illustrates a schematic diagram of an iMTM antenna module for use with the iMTM radar system of FIG. 4 in accordance with various examples of the subject technology.

Attention is now directed to FIG. 5, which illustrates a schematic diagram of an iMTM antenna module 500 for use with the iMTM radar system 400 of FIG. 4 in accordance with various examples. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The iMTM antenna module 500 has an DCiMTM antenna 502 coupled to an antenna controller 504, a central processor 506, and a transceiver 508. A transmission signal controller 510 generates the specific transmission signal, such as an FMCW signal, which is used for radar sensor applications as the transmitted signal is modulated in frequency, or phase. The FMCW signal enables a radar to measure range to a target by measuring the phase differences in phase or frequency between the transmitted signal and the received or reflected signal. Within FMCW formats, there are a variety of modulation patterns that may be used within FMCW, including triangular, sawtooth, rectangular and so forth, each having advantages and purposes. For example, sawtooth modulation may be used for large distances to a target; a triangular modulation enables use of the Doppler frequency, and so forth.

Other modulation types may be incorporated according to the desired information and specifications of a system and application. For example, the transmission signal controller 510 may also generate a cellular modulated signal, such as an Orthogonal Frequency Division Multiplexed ("OFDM") signal. In some examples, the signal is provided to the iMTM antenna module 500 and the transmission signal controller 510 may act as an interface, translator or modulation controller, or otherwise as required for the signal to propagate through a transmission line system. The received information is stored in a memory storage unit 512, wherein the information structure may be determined by the type of transmission and modulation pattern.

The DCiMTM antenna 502 includes a transmission array 520 and iMTM array 522. In operation, the DCiMTM antenna 502 radiates the signal to a radiating array of iMTM cells in the iMTM array 522. In various examples, the DCiMTM antenna 502 includes an impedance-matched feed network 516, having a reactance control module 518. The reactance control module 518 includes a reactance control mechanism controlled by antenna controller 504, which may be used to control the phase of a radiating signal from radiating array structures, such as iMTM array 522.

Note that as illustrated in FIG. 5, there is one DCiMTM antenna 502 in iMTM antenna module 500. However, an iMTM antenna module 500 may have multiple DCiMTM antennas in any given configuration. A set of DCiMTM antennas may be designated as transmit antennas, and another set may be designated as receive antennas. Further, a DCiMTM antenna may be orthogonal from another. Different DCiMTM antennas may also have different polarizations. In various examples, different DCiMTM antennas may be configured to detect different targets, e.g., a set of antennas may be configured to enhance the detection and identification of pedestrians, another set of antennas may be configured to enhance the detection and identification of vehicles, and so forth. In the case of pedestrians, the configuration of the antennas may include power amplifiers to adjust the power of a transmitted signal and/or different polarization modes for different arrays to enhance pedestrian detection. It is appreciated that numerous configurations of DCiMTM antennas may be implemented in a given iMTM antenna module.

In operation, the antenna controller 504 receives information from other modules in iMTM antenna module 500 and/or from iMTM perception module 404 in FIG. 4 indicating a next radiation beam, in which a radiation beam may be specified by parameters such as beam width, transmit angle, transmit direction and so forth. The antenna controller 504 determines a voltage matrix to apply to the reactance control module 518 in DCiMTM antenna 502 to achieve a given phase shift or other parameters. In these examples, the DCiMTM antenna 502 is adapted to transmit a directional beam without using digital beam forming methods, but rather through active control of the reactance parameters of the individual iMTM cells that make up the iMTM array 522.

Transceiver 508 prepares a signal for transmission, such as a signal for a radar device, in which the signal is defined by modulation and frequency. The signal is received by the DCiMTM antenna 502 and the phase of the iMTM cells in the iMTM array 522 is adjusted at the direction of the antenna controller 504. In some examples, transmission signals are received by a portion, or subarray(s), of the iMTM array 522. The iMTM array 522 can be implemented in many applications, including radar, cellular antennas, and autonomous vehicles to detect and identify targets in the path of or surrounding the vehicle. Alternate examples may use the iMTM array 522 for wireless communications, medical equipment, sensing, monitoring, and so forth. Each application type incorporates designs and configurations of the elements, structures and modules described herein to accommodate their needs and goals.

In iMTM antenna module 500, a signal is specified by antenna controller 504, which may be at the direction of an iMTM perception module (e.g., iMTM perception module 404 in FIG. 4), a sensor fusion module (e.g., sensor fusion module 220 in FIG. 2) via interface to sensor fusion 514, or it may be based on program information from memory storage unit 512. There are a variety of considerations to determine the beam formation, in which this information is provided to antenna controller 504 to configure the various elements of the iMTM array 522, which are described herein. The transmission signal controller 510 can generate the radar transmission signal (referred to as "radar signal" in FIG. 3) and provides it to beacon circuit 526, which may be implemented as beacon circuit 300 of FIG. 3. Alternatively, the beacon circuit 526 may be incorporated in the transceiver module 508. The beacon circuit (whether as a separate module 526 or in transceiver 508) generates a beacon signal frame (that includes a beacon signal superimposed to a radar signal) for DCiMTM antenna 502, such as through a coaxial cable or other connector. The beacon signal frame propagates through the impedance-matched feed network 516 to the transmission array 520 and iMTM array 522 for transmission through the air.

The impedance-matched feed network 516 includes impedance matching mechanisms and a reactance control module 518 for respectively matching input signal parameters with the iMTM cells in iMTM array 522 and providing phase shift control to each cell. The impedance matching mechanisms may include a directional coupler having an input port to each of adjacent transmission lines in the impedance-matched feed network 516. The adjacent transmission lines in impedance-matched feed network 516 may form a super element, in which an adjacent transmission line pair has a specific phase difference, such as a 90° phase difference with respect to each other.

The impedance matching mechanisms work in coordination with the reactance control module 518 to provide phase shifting of the radiating signal(s) from the iMTM array 522. In various examples, the reactance control module 518 includes a reactance control mechanism controlled by antenna controller 504, which may be used to control the phase of a radiating signal from the iMTM cells in the iMTM array 522 and to adjust the effective reactance of a transmission line and/or a cell fed by a transmission line in the impedance-matched feed network 516. The reactance control module 518 may, for example, include a varactor, a varactor network, a phase shift network, or any other mechanism capable of providing a desired phase shift up to 360° in each iMTM cell. The phase shift network system may include multiple varactors to achieve the desired phase shift.

One or more reactance control mechanisms may be placed within a transmission line in the impedance-matched feed network 516. Similarly, reactance control mechanisms may be placed within multiple transmission lines or within each iMTM radiating cell to achieve a desired result. The reactance control mechanisms may have individual controls or may have a common control. In some examples, a modification to a first reactance control mechanism is a function of a modification to a second reactance control mechanism. Further, the reactance control module 518 may be positioned within the architecture of impedance-matched feed network 516; one or both may be external to the impedance-matched feed network 516 for manufacture or composition as an antenna or radar module.

Figure 6:
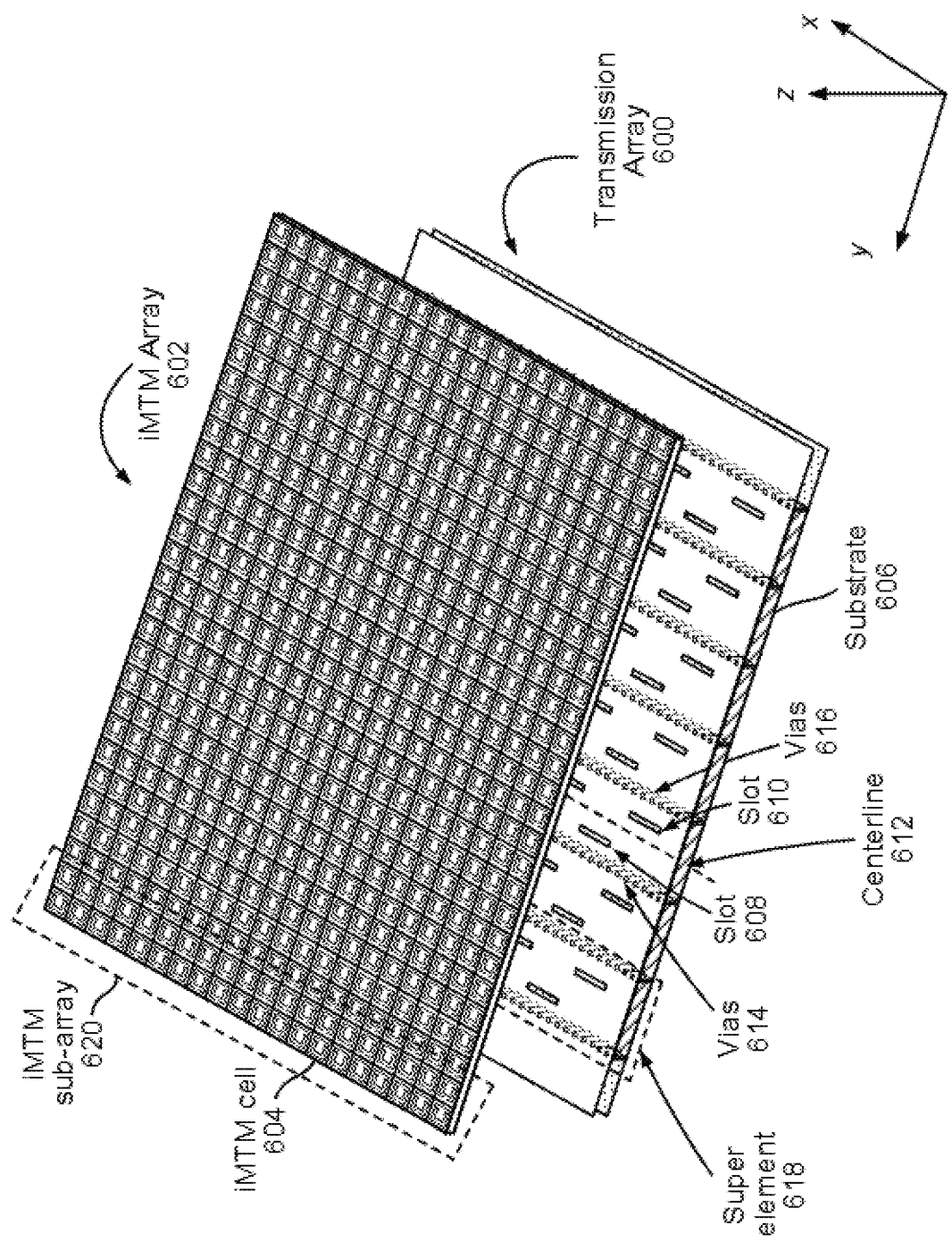
FIG. 6 illustrates a schematic diagram of a transmission array and an iMTM array for use in the DCiMTM antenna of FIG. 5 in accordance with various examples of the subject technology.

Attention is now directed to FIG. 6, which illustrates a schematic diagram of a transmission array 600 and an iMTM array 602 for use in the DCiMTM antenna 502 of FIG. 5 in accordance with various examples. The iMTM array 602 is composed of individual iMTM cells, such as iMTM cell 604. The iMTM array 602 may take a variety of forms and is designed to operate in coordination with the transmission array 600. The iMTM array 602 may also operate as a single array or may be controlled to operate as multiple subarrays, in which each of the array or subarrays acts to generate a radiation beamform that is steerable through control of the reactance of individual iMTM unit cells. In various examples, the transmission signals sent by the transceiver 508 of FIG. 5 are received by a portion, or subarray, of iMTM array 602, such as iMTM subarray 620. The iMTM array 602 is an array of individual iMTM radiating cells (e.g., an 8×16 array), in which each of the iMTM cells has a uniform size and shape; however, some examples may incorporate different sizes, shapes, configurations and array sizes.

The transmission array 600 includes a substrate 606 having multiple conductive layers and a dielectric layer sandwiched therebetween. In various examples, the transmission array 600 is configured as super elements that are along the x-direction of the iMTM array 602, in which each super element includes a plurality of slots or discontinuities (e.g., slots 608-610) in the conductive layer proximate the iMTM cells in iMTM array 602. A signal is provided to each of the super elements that radiates through the slots in the super elements and feeds the iMTM cells in iMTM array 602. The various super elements may be fed with signals of different phase, thus providing phase shifting in the y-direction, while the iMTM array 602 may be controlled so as to shift the phase of the transmission signal in the y-direction and/or the x-direction, in which the signal transmits in the z-direction. The ability to control the directivity and phase of the transmission signal provides flexibility and responsive behavior for wireless communications and radar applications.

The transmission array 600 may be referred to as a type of a Slotted Waveguide Antenna ("SWA") and may include passive or active components (not shown) for matching phase control, amplitude tampering, and other RF enhancement functionalities. The distances between the iMTM unit cells in iMTM array 602 can be much lower than half the wavelength of the radiating frequency of the transmission signal. Active and passive components may be placed on the iMTM cells with control signals either routed internally through the super elements or externally through or on upper portions of the transmission array 600. Alternate configurations may reconfigure and/or modify the transmission array 600 and iMTM array 602 to improve radiation patterns, bandwidth, side lobe levels, and so forth.

The antenna performance may be adjusted by design of the transmission array 600 features and materials, such as the shape of the slots, slot patterns, slot dimensions, conductive trace materials and patterns, as well as other modifications to achieve impedance matching and so forth. The substrate 606 may have two or more portions of dielectric separated by a slotted transmission line positioned therebetween. The slotted transmission line may be disposed on substrate 606, in which each transmission line is within a bounded area; the boundary is a line of vias (e.g., vias 614, 616) etched through the conductive layer. The slots are configured within the conductive layer, where in the illustrated example the slots 608 and 610 are positioned symmetrically with respect to the center line 612. For clarity of understanding, FIG. 6 illustrates the slots as equidistant from center line 612, where the slots 608 and 610 are on opposite sides of the centerline 612 and staggered along the direction thereof. A small portion super element 618 is illustrated in the transmission array 600.

Figure 7:
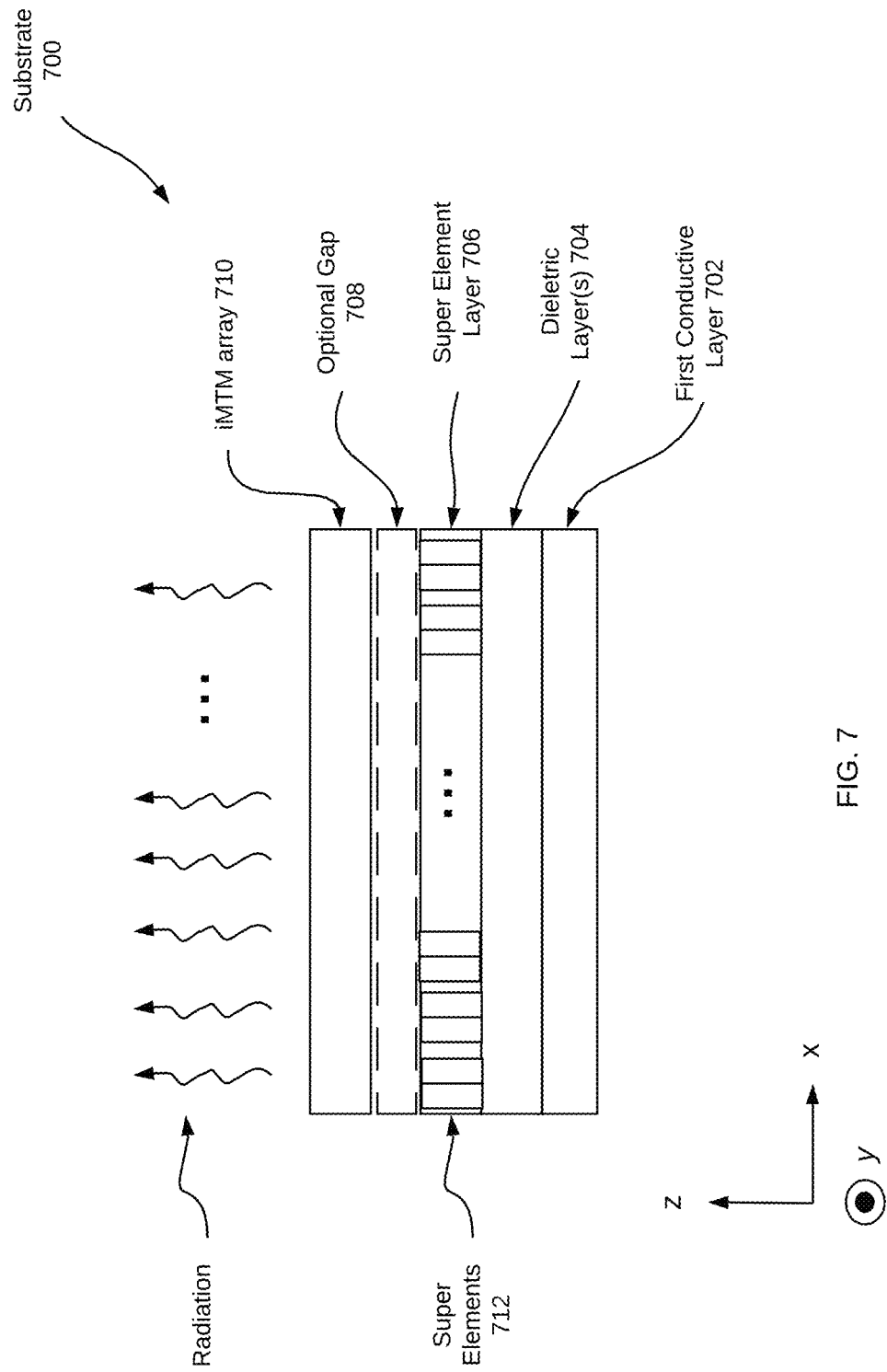
FIG. 7 illustrates another perspective of the transmission array and iMTM array of FIG. 6 illustrating their various layers in accordance with various examples of the subject technology.

FIG. 7 illustrates another perspective of the transmission array 600 and iMTM array 602 of FIG. 6 illustrating their layers in accordance with various examples. Substrate 700 includes a first conductive layer 702, a dielectric layer(s) 704, and a super element layer 706. The super elements are formed by conductive and non-conductive traces on a top portion of the super element layer 706 and by vias formed through the super element layer 706 and through the dielectric layer(s) 704. The vias (not shown) are lined with conductive material, or may be filled with conductive material, so as to form channels defining the super elements 712 and providing a wave guide function to maintain propagation of the signals fed into the super elements 712. An optional gap 708 may be placed between the super element layer 706 and the iMTM array 710, which contains the iMTM cells. The longitudinal direction of the super elements 712 in the perspective of FIG. 7 is into the page, in the y-direction, with the signal radiating in the z-direction. Again, note these directions are for illustration and description purposes only and do not necessarily correlate to absolute references. Note also that the substrate 700 may be part of a DCiMTM antenna in a sensor fusion module (e.g., sensor fusion module 220 of FIG. 2) within the vehicle or infrastructure, whereby different locations share information and communicate with each other to provide information ahead of action, such as to identify a speeding car several blocks before it actually is in range of a given sensor. One or multiple sensors may provide alerts to other sensors in the environment to help detect other vehicles moving at a relatively high velocity.

Figure 8:
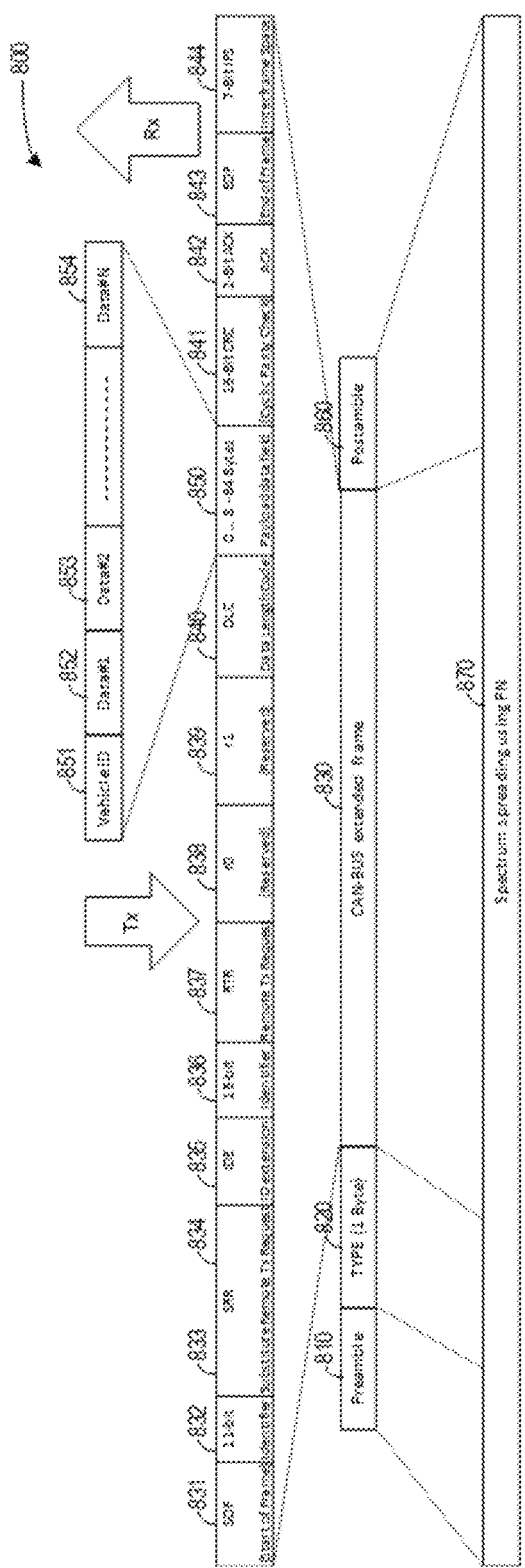
FIG. 8 illustrates a schematic of an example of a frame format for a Controller Area Network ("CAN") interface between a beacon system and vehicle network, according to some implementations of the subject technology.

FIG. 8 illustrates a schematic of an example of a frame format 800 for a CAN interface between a beacon system and vehicle network, according to some implementations of the subject technology. Not all of the depicted components may be used, however, and one or more implementations may include additional components not shown in the figure. Variations in the arrangement and type of the components may be made without departing from the scope of the claims set forth herein. Additional components, different components, or fewer components may be provided.

In some implementations, the transceiver (e.g., 320, 408, 508) of the radar system can be, or include at least a portion of, a CAN transceiver that is specified as the interface with the beacon subsystem (e.g., 228, 300, 526). In this respect, the transceiver module may include an interface to the in-vehicle network that utilizes a CAN interface standard. In a transmitter portion of the CAN transceiver, the vehicle ID data and other identification data are mapped into a baseband beacon signal frame that has a CAN-compliant frame format and formatted into a radio frame containing a preamble 810, a type filed 820, a CAN-BUS extended frame field 830, and a postamble field 860. The CAN-BUS extended frame 830 includes a Start-of-Frame ("SOF") field 831, an identifier field 832, a substitute remote Tx request field 834, an ID extension field 835, a second identifier field 836, a remote Tx request field 837, reserved fields 838 and 839, data length code field 840, a payload data field 850, a Cyclic Parity Check ("CRC") field 841, an Acknowledgment ("ACK") field 842, an End-of-Frame ("EOF") field 843, and an interframe space field 844. The payload data field 850 includes a vehicle ID field 851 and data fields 852-854. The baseband beacon signal frame having the frame format 800 is spectrum spread using a PN code (870), modulated and emitted through the air interface. In a receiver portion of the CAN transceiver, the processing order is inversed.

In the frame configuration based on the frame format 800, the PN code can have an impact in the system performance in terms of processing gain. For example, the longer the PN code sequence, the more performance improvements are observed in terms of system interference, because the power spectral density of the PN code sequence is lower. If the vehicle ID and other ID information are transmitted, a long PN code can be used for interference avoidance purpose. In some examples, the beacon is transmitted periodically with a low duty cycle so that the data rate is relatively low. In some implementations, other omni-directional services data can be conveyed by the beacon channel. For example, since the CAN-BUS extended frame can support variable data rates, the PN code sequence length can be determined by the following expression:

$$L=RF_{BW}/(2*R_b),\qquad\text{Eq. (1)}$$

where $RF_{BW}$ is the RF bandwidth, $R_b$ is the data rate, and L is the PN code length. In some examples, the data rate is in a range of 125 kbps to 1 Mbps (up to 8 Mbps with CAN-FD (Flexible Data-Rate)). In some examples, the RF bandwidth can be in a range of 1 GHz to about 4 GHz. For example, when $R_b$=1 Mbps, and $RF_{BW}$=4 GHz, the PN code sequence length is L=2000. In this respect, a set of ZC codes having a code length of about 2000 can be specified, which provides a processing gain as high as 33 dB at a manageable signal processing complexity. The beacon signal power spectral density can be lower than the processing gain by about 33 dB, which would not interfere with any other radio systems operating in the same frequency band including automotive radar systems.

In some implementations, the interface between a beacon system (e.g., 228, 300, 526) and a CAN-Bus system includes mapping/demapping MAC layer frames, respectively, to/from the frame format 800 as illustrated in FIG. 8. The mapping and demapping can be performed with MPDUs at the MAC layer and with the payload data field 850 of up to a predetermined bit length (e.g., 9 bytes or 54 bits). In cases where the payload data field 850 contains less than 54 bits, the mapping operation may apply zero-stuffing (or other dummy values). If the payload data field 850 contains more than 54 bits, the frame format 800 may include multiple CAN-Bus frames, where each frame has a 54-bit data field. In one or more implementations, a CAN-FD frame format can support a larger data field of up to 64 Bytes and a data rate up to 8 Mbps.

Figure 9:
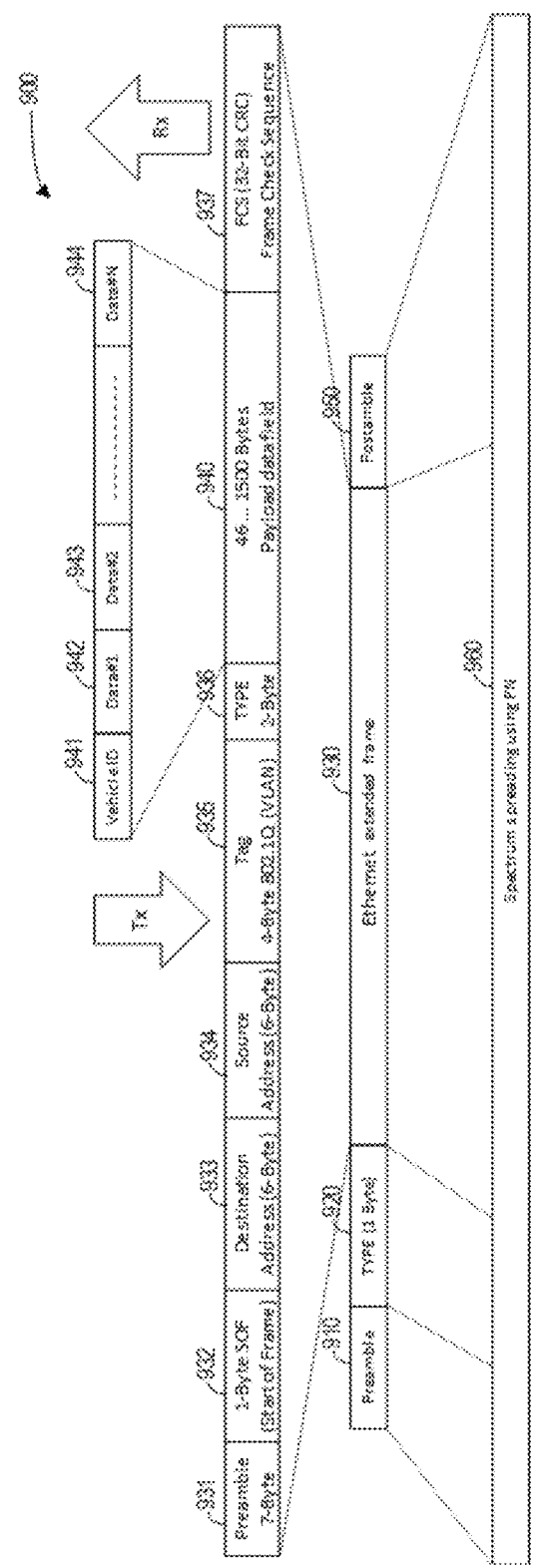
FIG. 9 illustrates a schematic of an example of a frame format for an Ethernet interface between a beacon system and vehicle network, according to some implementations of the subject technology.

FIG. 9 illustrates a schematic of an example of a frame format 900 for an Ethernet interface between a beacon system and vehicle network, according to some implementations of the subject technology. Not all of the depicted components may be used, however, and one or more implementations may include additional components not shown in the figure. Variations in the arrangement and type of the components may be made without departing from the scope of the claims set forth herein. Additional components, different components, or fewer components may be provided.

In some implementations, the transceiver (e.g., 320, 408, 508) of the radar system can be, or include at least a portion of, an Ethernet transceiver that is specified as the interface with the beacon subsystem (e.g., 228, 300, 526). In this respect, the transceiver module may include an interface to the in-vehicle network that utilizes an Ethernet interface standard. In a transmitter portion of the Ethernet transceiver, the vehicle ID data and other data are mapped into a baseband beacon signal frame that has an Ethernet-compliant frame format (e.g., MPDU frame) and formatted in radio frame containing a preamble 910, a type field 920, an Ethernet extended frame 930, and a postamble field 950. The Ethernet extended frame field 930 includes a preamble field 931, a SOF field 932, a destination field 933, a source field 934, a tag field 935, a type field 936, a payload data field 940, and a Frame Check Sequence ("FCS") field 937. The payload data field 940 includes a vehicle ID field 941 and data fields 942-944. The baseband beacon signal frame having the frame format 900 is spectrum spread using a PN code (960), modulated and emitted through the air interface. In a receiver portion of the Ethernet transceiver, the processing order is inversed.

A similar procedure is used for an automotive Ethernet based configuration and the PN code length is also given by the following expression:

$$L=RF_{BW}/(2*R_b)\qquad\text{Eq. (2)}$$

Although automotive Ethernet can support data rates in a range of 10 Mbps to about 100 Mbps, the requirements for bandwidth use by the beacon system are relatively low and a long PN code also can be used for interference avoidance purpose. In addition, other omni-directional services data can be conveyed by the beacon channel, and the beacon channel has sufficient capacity for these applications. For example, if an RF beacon frame is sent periodically with a low duty cycle at a data rate $R_b$=2 Mbps, and the available bandwidth $RF_{BW}$=4 GHz, then the PN code sequence length is L=1000. In this respect, a set of ZC codes having a code length of about 1000 can be specified, which provides a processing gain as high as 30 dB at a manageable signal processing complexity. The beacon signal power spectral density can be lower than the processing gain by 30 dB, which would not interfere with any other radio systems operating in the same frequency band including automotive radar systems.

In some implementations, the interface between a beacon system (e.g., 228, 300, 526) and an Ethernet interface (e.g., 100BASE-T1) includes mapping/demapping MAC layer frames, respectively, to/from the frame format 900 as illustrated in FIG. 9. The mapping and demapping can be performed with MPDUs at the MAC layer and with the payload data field 940 in a range of 46 bytes to about 1500 bytes. Bit-stuffing can be used in cases where the payload data is less than 46 bytes. For example, when the payload data field 940 contains less than 54 bits, the mapping operation may apply zero-stuffing. If the payload data field 940 contains more than 54 bits, the frame format 900 may include multiple 100BASE-T1 frames, where each frame has a 54-bit data field.

These various examples support autonomous driving with improved sensor performance, all-weather/all-condition detection, advanced decision-making algorithms and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. Sensor performance is also enhanced with these structures, enabling long-range and short-range visibility. In an automotive application, short-range is considered within 30 meters of a vehicle, such as to detect a person in a cross walk directly in front of the vehicle; and long-range is considered to 250 meters or more, such as to detect approaching cars on a highway. These examples provide automotive radars capable of reconstructing the world around them and are effectively a radar "digital eye," having true 3D vision and capable of human-like interpretation of the world.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar system in an ego vehicle, comprising:
a beacon system configured to generate a superimposed signal from a radar signal and a beacon signal, wherein the superimposed signal comprises vehicle identification information that identifies the ego vehicle, wherein the beacon system comprises a multiplier configured to multiply a vehicle identification message signal with a pseudo-random noise code signal to produce the beacon signal;
a meta-structure antenna module comprising one or more meta-structure antennas that are configured to radiate dynamically controllable Radio Frequency ("RF") beams to a surrounding environment of the ego vehicle, the dynamically controllable RF beams containing the superimposed signal; and
a perception module configured to detect and identify a target in the surrounding environment of the ego vehicle using one or more return RF beams reflected from the target based at least on the radiated dynamically controllable RF beams.

2. The radar system of claim 1, wherein the beacon system comprises:
a summation circuit coupled to an output of the multiplier and configured to combine the radar signal with the beacon signal to produce a first superimposed signal having a first frequency; and a frequency converter configured to convert the first superimposed signal into a second superimposed signal having a second frequency that is greater than the first frequency, wherein the one or more meta-structure antennas transmit the second superimposed signal to other vehicles.

3. The radar system of claim 1, wherein the meta-structure antenna module further comprises:

an iMTM array comprising a plurality of iMTM cells;

an impedance-matched feed network coupled to the iMTM array and configured to match input signal parameters with the plurality of iMTM cells of the iMTM array and to provide a phase shift control to each of the plurality of iMTM cells; and a transmission array coupled to the iMTM array and the impedance-matched feed network and configured to feed signals from the impedance-matched feed network to the iMTM array, wherein the superimposed signal propagates through the impedance-matched feed network to the transmission array and the iMTM array for transmission.

4. The radar system of claim 1, wherein the vehicle identification information includes one or more of a vehicle identification number of the ego vehicle, a vehicle license plate number, or other type of vehicle information contained in a short message for broadcast with the beacon system.

5. The radar system of claim 1, wherein the superimposed signal includes an instruction to the target to measure a condition of a medium in a frequency band such that a communication link is established between the ego vehicle and the target over one or more channels of the frequency band.

6. The radar system of claim 1, wherein the beacon signal is further superimposed with the radar signal at a baseband frequency or at an intermediate frequency.

7. A radar system in a vehicle, comprising:

a beacon circuit configured to generate a superimposed signal from a radar signal and a beacon signal, wherein the superimposed signal comprises vehicle identification information that identifies the vehicle;

a meta-structure antenna module configured to radiate dynamically controllable Radio Frequency ("RF") beams to a surrounding environment of the vehicle, the dynamically controllable RF beams containing the superimposed signal; and a perception module configured to detect and identify a target in the surrounding environment of the vehicle using one or more return RF beams reflected from the target based at least on the radiated dynamically controllable RF beams, wherein the superimposed signal includes an instruction to the target to measure a condition of a medium in a frequency band such that a communication link is established between the vehicle and the target over one or more channels of the frequency band.

8. The radar system of claim 7, wherein the beacon circuit comprises a multiplier configured to multiply a vehicle identification message signal with a pseudo-random noise code signal to produce the beacon signal.

9. The radar system of claim 7, wherein the beacon circuit comprises a summation circuit coupled to an output of the multiplier and configured to combine the radar signal with the beacon signal to produce a first superimposed signal having a first frequency; and a frequency converter configured to convert the first superimposed signal into a second superimposed signal having a second frequency that is greater than the first frequency.

10. The radar system of claim 7, wherein the vehicle identification information includes one or more of a vehicle identification number of the vehicle, a vehicle license plate number, or other type of vehicle information contained in a short message for broadcast with the beacon system.

11. The radar system of claim 7, wherein the meta-structure antenna module comprises an array comprising a plurality of radiating cells and an impedance-matched feed network coupled to the array and configured to match input signal parameters with the plurality of radiating cells of the array and to provide a phase shift control to each of the plurality of radiating cells.

12. The radar system of claim 11, wherein the meta-structure antenna module further comprises a transmission array coupled to the array and the impedance-matched feed network and configured to feed signals from the impedance-matched feed network to the array, wherein the superimposed signal propagates through the impedance-matched feed network to the transmission array and the array for transmission.

13. The radar system of claim 7, wherein the beacon signal is further superimposed with the radar signal at a baseband frequency or at an intermediate frequency.

14. A radar system, comprising:

a beacon system configured to generate a superimposed signal from a radar signal and a beacon signal, wherein the superimposed signal comprises vehicle identification information that identifies a vehicle, wherein the beacon system comprises:

a multiplier configured to multiply a vehicle identification message signal with a pseudo-random noise code signal to produce the beacon signal, a summation circuit coupled to an output of the multiplier and configured to combine the radar signal with the beacon signal to produce a first superimposed signal having a first frequency, and a frequency converter configured to convert the first superimposed signal into a second superimposed signal having a second frequency that is greater than the first frequency; and an antenna module configured to radiate Radio Frequency ("RF") beams containing the superimposed signal to a surrounding environment.

15. The radar system of claim 14, further comprising:

a perception module configured to detect and identify a target in the surrounding environment using one or more return RF beams.

16. The radar system of claim 14, wherein the superimposed signal includes an instruction to a target in the surrounding environment to measure a condition of a medium in a frequency band such that a communication link is established between the vehicle and the target over one or more channels of the frequency band.

17. The radar system of claim 14, wherein the vehicle identification information includes one or more of a vehicle identification number of the vehicle, a vehicle license plate number, or other type of vehicle information contained in a short message for broadcast with the beacon system.

18. The radar system of claim 14, wherein the antenna module comprises an array comprising a plurality of cells and an impedance-matched feed network coupled to the array and configured to match input signal parameters with the plurality of cells of the array and to provide a phase shift control to each of the plurality of cells.

19. The radar system of claim 18, wherein the antenna module further comprises a transmission array coupled to the array and the impedance-matched feed network and configured to feed signals from the impedance-matched feed network to the array, wherein the superimposed signal propagates through the impedance-matched feed network to the transmission array and the array for transmission.

20. The radar system of claim 14, wherein the beacon signal is further superimposed with the radar signal at a baseband frequency or at an intermediate frequency.

* * * * *